United States Patent [19]

Sato

[11] 4,331,076

[45] May 25, 1982

[54] BAR CODE PRINTING DEVICE

[75] Inventor: Yo Sato, Tokyo, Japan

[73] Assignee: Kabushiki Kaisha Sato, Japan

[21] Appl. No.: 158,320

[22] Filed: Jun. 10, 1980

[30] Foreign Application Priority Data

Jun. 15, 1979 [JP] Japan .............................. 54-82601[U]

[51] Int. Cl.³ .......................... B41K 1/12; B41K 1/42
[52] U.S. Cl. ..................................... 101/110; 101/288
[58] Field of Search ........................ 101/110, 111, 288

[56] References Cited

U.S. PATENT DOCUMENTS

| | | | |
|---|---|---|---|
| 2,730,041 | 1/1956 | Russell ................................. | 101/110 |
| 3,796,152 | 3/1974 | Finke et al. ......................... | 101/111 |
| 4,010,682 | 3/1977 | Hamisch, Jr. ..................... | 101/93.02 |
| 4,018,157 | 4/1977 | Sato .................................... | 101/110 |
| 4,050,375 | 9/1977 | Orlens ................................. | 101/110 |
| 4,055,118 | 10/1977 | Sato .................................... | 101/110 |
| 4,096,800 | 6/1978 | Kistner et al. ...................... | 101/110 |
| 4,149,460 | 4/1979 | Sato .................................... | 101/110 |
| 4,155,302 | 5/1979 | Sato .................................... | 101/110 |

*Primary Examiner*—William Pieprz

*Attorney, Agent, or Firm*—Ostrolenk, Faber, Gerb & Soffen

[57] ABSTRACT

The disclosure concerns a bar code printing device for use with the printing head of a portable label printing and applying machine, or the like. A plurality of juxtaposed index rings are selectively turned by a selecting member and each index ring turns a corresponding meshing bar code type ring into a selected printing position. The type rings are also juxtaposed. A rotary member is also turned by the selecting member for causing straight line reciprocating movement of an actuating member across the axis of the rotary member and this in turn moves a thrust member in the axial direction of the type rings. The thrust member is moved to bias the type rings during the printing operation so that the type rings are forced into close contact. The thrust member is also moved to permit the type rings to be left as they are, during the imprintable type selecting operation, so that the type rings are spaced by gaps which facilitate the selective rotation of the rings by the selecting member.

20 Claims, 11 Drawing Figures

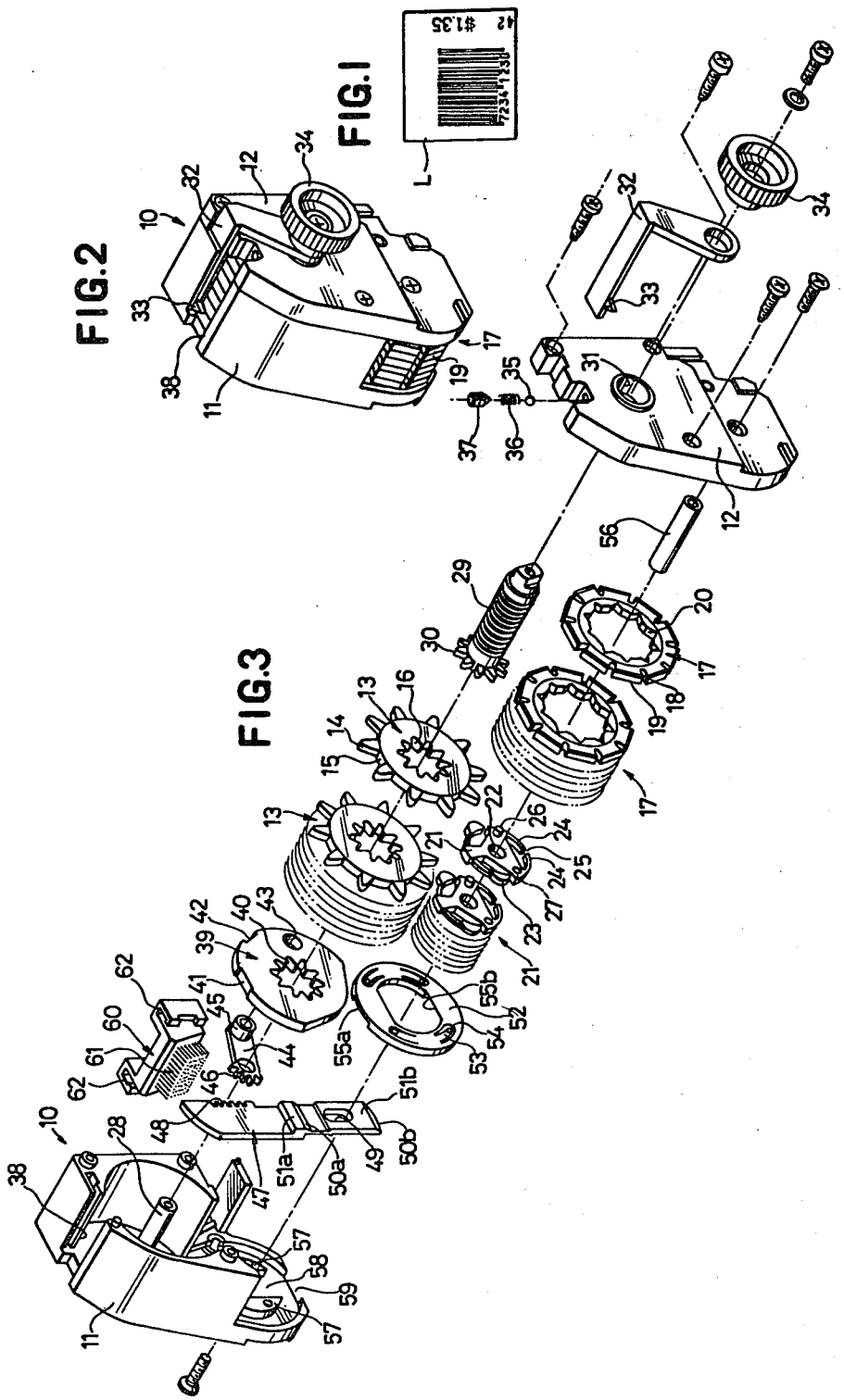

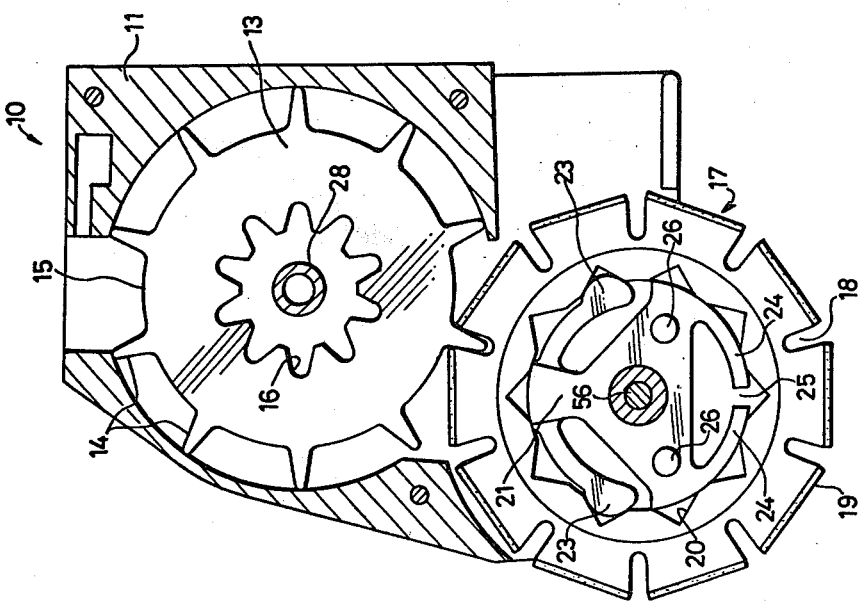

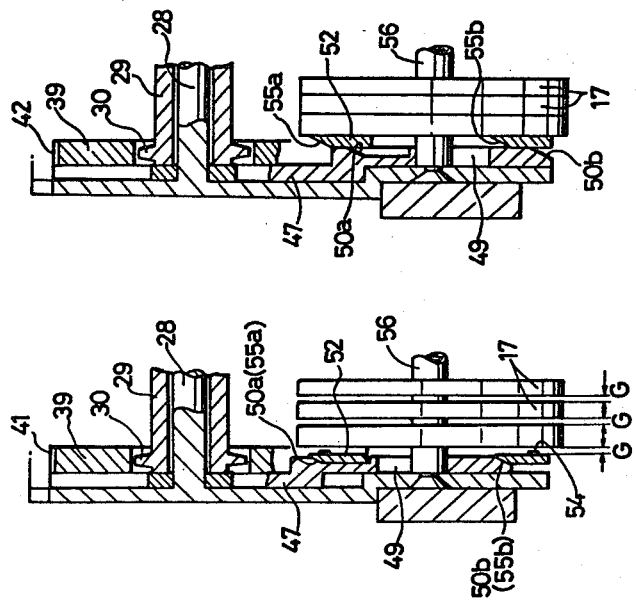
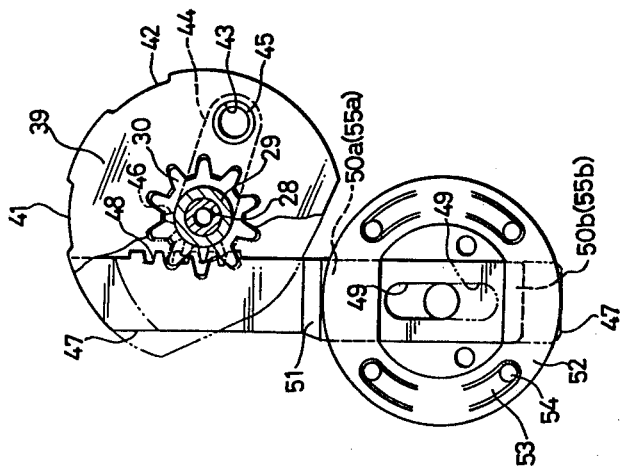

BAR CODE PRINTING DEVICE

BACKGROUND OF THE INVENTION

1. Field of the Invention

The present invention relates to a printing device for printing bar codes which can be omnidirectionally read out in an automatic manner by means of an optical reader, and more particularly to improvements in a bar code printing device which is used with a portable label printing and applying machine or a table type automatic label printer, or the like, so that it can print bar code on a series of composite labels each composed of a label and a sheet of backing paper.

2. Description of the Prior Art

Representative printing devices of this kind are disclosed in U.S. Pat. Nos. 4,018,157 and 4,155,302, both by the inventor hereof.

Recently, the so-called "POS" (Point-of-Sale) system has been put into practice in large size supermarkets. In one type of bar code, as shown on label L in FIG. 1 of the drawings hereof, one numeral is composed, in combination, of two dark bars having a height of 14 mm and two light spaces, both of which are arranged in parallel to constitute one character (or seven modules). The character thus constituted is required to have a width of 2.31 mm with an allowance of ±0.101 mm.

The bar code printing device has a plurality of bar code rings juxtaposed side by side on a common axis of rotation. Each of the bar code type rings is formed with a set of numerals. Each numeral is composed of dark and light bars having sizes selected to correspond to the particular numeral. The bar code numeral is made highly accurate.

However, there are problems in establishing precise gaps between the type rings, which are axially juxtaposed. Even the one light space which is left at one end of each bar code type ring plays an important role as a symbol. Therefore, an unnecessary gap between two adjacent type rings would cause an incorrect number to be read out by the optical reader. On the other hand, when the respective bar code type rings are pushed together in fixed contact, a desired ring cannot be selectively turned to change the numeral thereon.

SUMMARY OF THE INVENTION

It is therefore an object of the present invention to provide a printing device which is free from the disadvantages of the prior art.

Another object of the present invention is to provide a highly precise printing device.

A further object of the invention is to assure that the gaps required for ensuring smooth rotation of the bar code type rings are established between the adjacent type rings, when any of them is to be selectively turned.

Yet another object of the invention is to assure that the gaps for smooth rotation of the type rings are eliminated when the bar code type rings are to be used for printing purposes, thereby to force the type rings into fixed close contact so that widthwise errors in the printed multi-numeral bar code may be minimized.

The present invention provides a bar code printing device. There is a plurality of index rings axially juxtaposed to one another in a manner to rotate independently of one another. A selecting member selectively turns any of the index rings into a desired position. There is a corresponding plurality of bar code type rings which are juxtaposed to one another, and each meshes with a respective index ring. Any type ring can be rotated to a selected position by the corresponding index ring. A rotary member is disposed at the end of the row of index rings. The rotary member is adapted to be turned by the selecting member. There is an actuating member that is adapted to be moved, preferably in straight line reciprocating motion across the axis of the rotary member, by the rotary member. There is a thrust member having an elasticity and adapted to be actuated in the axial direction of the row of bar code type rings by the actuating member. During the printing operation, the thrust member elastically thrusts the bar code type rings into close contact. During the bar code selecting operation, the thrust member leaves the bar code type rings as they are, so that said bar code type rings are spaced by gaps for facilitating selective rotation of any type ring.

BRIEF DESCRIPTION OF THE DRAWINGS

Other objects and features of the present invention will become apparent from the following description considered with the reference to the accompanying drawings, in which:

FIG. 1 shows a label which has been printed with bar codes by means of a bar code printing device according to the present invention;

FIG. 2 is a perspective view of a printing head which is equipped with the bar code printing device according to the present invention;

FIG. 3 is an exploded perspective view of the same printing head showing the overall construction of the bar code printing device;

FIG. 4 is a longitudinal sectional view showing the printing head in its printing condition, with the bar code type rings in forced lateral contact;

FIG. 5 is a sectional view taken along line V—V of FIG. 4;

FIG. 6 is an elevational view of the actuating member of the bar code printing device;

FIGS. 7 and 8 are longitudinal sectional views of the actuating member of FIG. 6 when the bar code type rings are being rotated to select a bar code and when the bar code type rings are forced into contact, respectively;

DESCRIPTION OF THE PREFERRED EMBODIMENT OF THE INVENTION

Figure 9:
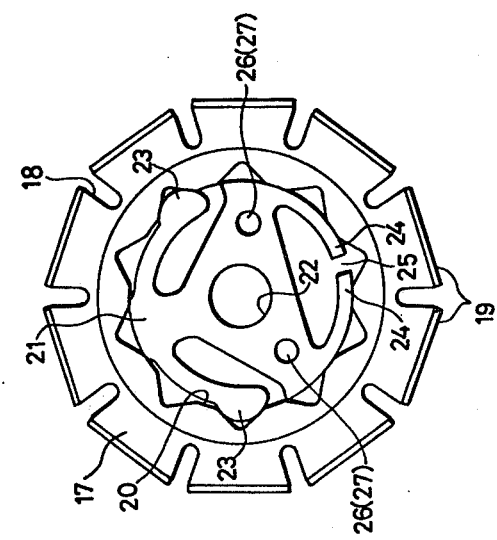
FIG. 9 is a front elevational view illustrating the relationship between one of the bar code type rings and one of the bearing members.

The bar code printing device according to the present invention is now described. Referring to FIGS. 2 and 3, the shell of a bar code printing head 10 is comprised of a casing 11 and a cover frame 12, in which are accommodated both a group of eight bar code type rings 17 axially juxtaposed to one another and a group of eight index rings 13 also axially juxtaposed to one another and meshing with the type rings 17, respectively, thereby to make it possible to print the bar codes.

The index rings are disposed at an upper portion of the printing head 10. Each of the rings 13 is formed on its outer circumference with ten external teeth 14, and on the remainder of the outer circumference or between the external teeth 14 with ten index numerals 15 from "0" to "9". At its center each index ring 13 has a hole through it which is defined and surrounded by internal teeth 16. The teeth can mesh with the pinion gear 30 of a selecting member 29, described below.

The bar code type rings 17 are disposed at a lower portion of the printing head 10. Each type ring 17 has indentations 18 on its outer circumference which mesh with the external teeth 14 of the rings 13. On the remaining outer circumference of the ring 17 or between the indentations 18, the ring 17 has printing surfaces which are formed with bar codes 19.

There are ten printing surfaces giving the ring 17 a decagonal shape. Each side of the ring 17 is formed with a respective bar code 19 and each such bar code corresponds to a respective index numeral 15 of the aforementioned index ring 13. The bar codes 19 and the respective numerals 15 are so placed that when a particular numeral on the index ring is at a viewing location, described below, the corresponding bar code is at a printing location at a printing surface. Moreover, each side of the ring 17 has a printing surface which is set to protrude from a bar code printing aperture 59 that is positioned just below the printing head 10. The bar code type ring 17 has an opening through its center which is defined by and surrounded by internal teeth 20, and in which is fitted a respective bearing member 21 that is mounted rotatably on a main shaft 56.

Each bearing member 21 includes a first pair of elastic, circumferentially extending, oppositely directed top retaining arms 23 and includes a second pair of circumferentially extending, oppositely directed and opposed, lower elastic arms 24 which are separated at a cut portion 25. Each of arms 23 and 24 are sized and shaped to elastically mesh and engage with the inner circumference of and the inner teeth of the corresponding bar code type ring 17. The paired retaining arms 23 ensure there is indexed rotation of the corresponding type ring 17 when the type ring is to be selectively turned because the lobes at the ends of the arms 23 engage in the teeth of the ring 17. The paired elastic arms 24 absorb the impact on the corresponding type ring 17 when the ring is moved to print. For this purpose, the arms 24 extend around the bottom of the ring 17. Further details of the bearing members 21 are described below.

Each bearing member 21 has pair of pins 26 formed on one side thereof and a corespondingly shaped and positioned pair of holes 27 on the other side thereof so that the adjoining bearing members 21 are formed into a block by the engagements of the pins 26 and the holes 27. The bearing member 21 has a center hole therethrough, in which is fitted the main shaft 56. That shaft is fastened to the side frame of the casing 11 and to the cover frame 12 by screws. As a result, the bearing members 21 are supported on the main shaft 56 so that the bar code type rings 17 and accordingly the afore-mentioned index rings 13 are made rotatable.

The type selecting member is in the form of a sleeve shaped shaft 29. It is to be brought into engagement with a desired one of the index rings 13 for selectively turning it. The selecting sleeve shaft 29 is fitted on a guide shaft 28 which is mounted on the casing 11, and the shaft 29 can slide in the axial direction of the shaft 28. The selecting sleeve shaft 29 has a pinion gear 30 at its leading end and the gear 30 is brought into meshing engagement with the internal teeth 16 of the selected index ring 13. The stem portion of the selecting sleeve shaft 29 extends through a guide hole 31 which is formed in the cover frame 12. On the other end of the sleeve shaft 29 from the gear 30, there is a selecting knob 34. An indicator 32 is rotatably supported on the shaft 29. The indicator includes a pointer 33 for indicating the index numeral 15 of the index ring 13 selected.

The index numerals 15 of the index rings 13 and of a later-described rotary member 39 are manually rotated by knob 34 while being observed through an index aperture 38 which is formed in the top of the printing head 10. The pointer 33 is guided to indicate the selected numeral showing at the aperture 38.

The selecting sleeve shaft 29 has a plurality of circumferential grooves at spaced intervals along its length which regulate the axial movement of the sleeve shaft 29 to any preset axial position. Regulation of the axial movement of the sleeve shaft 29 is effected by selective engagement between one of the grooves and a pressure member which is mounted in an upper portion of the cover frame 12. The pressure member is comprised of a steel ball 35 which is urged against the shaft 29 by a coil spring 36 that pushes off a stop screw 37 in the cover frame 12.

At the opposite side of the index ring group 13 from the knob 34 and coaxial with the selecting sleeve shaft 29, there is disposed the rotary member 39 which is made coactive with the sleeve shaft 29. The rotary member 39 has an opening through it which is formed with internal teeth 40 that are sized and shaped to mesh with the pinion gear 30 of the sleeve member 29. The rotary member 39 has the indications "Select" 41 and "Print" 42 formed on its outer circumference.

An actuating arm 44 is mounted on the rotary member 39 to rotate therewith. The actuating arm has a mounting stud 45 which is fitted in the mounting hole 43 in the member 39. The other end of the actuating arm 44 is profiled to define a pinion 46 for meshing with the rack 48 of an actuating member 47, and the actuating member 47 is moved up and down with respect to the printing head 10. Such motion either forces the bar code type rings 17 into close contact for printing or leaves those rings as they are, with gaps between them.

The actuating member 47 is arranged at the opposite end of the bar code type ring group 17 from the knob 34. The actuating member has a slot 49 formed at its lower portion, in which the main shaft 56 is loosely fitted. The side surface of the actuating member 47 facing the type ring group 17 is formed with upraised land surfaces 51a and 51b which are each formed at both of their top and bottom sides with tapered surfaces 50a and 50b.

A thrust member 52 is sandwiched between the actuating member 47 and the end of the bar code type ring group 17. On the side of the thrust member 52 facing toward the actuating member 47, tapered surfaces 55a and 55b are formed (see FIG. 8). They taper, in the thickness dimension of the member 52, toward the periphery of that member. The surfaces 55a and 55b are sized and shaped and oriented to engage with the tapered surfaces 50a and 50b of the actuating member 47.

On its outer surface facing toward the type ring group, the thrust member carries two pairs of elastic flaps 53 which are punched out from the thrust member and apply an elastic thrust to the aforementioned type ring group 17. For this purpose, the elastic flaps 53 are formed with projections 54 at their leading ends.

The actuating member 47 is received in and guided for sliding movement in the vertical direction by a vertical guide groove 58, which is defined by the crescent shaped thrust pads 57 that are mounted on the side frame of the casing 11.

Since the bar codes must be highly precisely and clearly printed, a cleaning member 60 is attached to the printing head 10 for removing ink or dust. The cleaning member 60 has a brush 61 at its center and has two attaching portions 62 at both sides, at which the member 60 is removably attached to the frames of the printing head 10. Thus, the brush 61 is brought into abutment against the selected bar codes 19 of the respective bar code type rings 17 so that the bar codes 19 may be cleaned when the respective type rings 17 are selectively turned.

The selecting and printing operations of the bar code type rings 17 are now described. The selecting operation for the bar code type rings 17 is described with reference to FIGS. 4 and 6 to 8. Start with the printing head in the printing condition. The pinion gear 30 of the selecting sleeve shaft 29 is in meshing engagement with the internal teeth 40 of the rotary member 39 and the "Print" indication 42 is being pointed at by the pointer 33 of the indicator 32. This is the condition shown in FIG. 4. The selecting sleeve shaft 29 is manually turned clockwise, as viewed in FIG. 6, by a preset angle so that the rotary member 39, now meshing with the shaft 29, is accordingly turned clockwise until the pointer 33 indicates the "Select" indication 41. This rotation of the rotary member 39 raises the actuating member 47 with respect to the printing head 10, as shown in FIGS. 6 and 7, in synchronism with the rotations of the rotary member 39 and the actuating arm 44.

As a result, the tapered surfaces 50a and 50b of the actuating member 47 engage the corresponding tapered surfaces 55a and 55b of the thrust member 52, which had been thrusting the bar code type rings 17 together, thereby to release the thrust force so that gaps G are established between adjacent bar code type rings 17 which are juxtaposed to one another. The gaps G permit individual type rings 17 to be selected and rotated without difficulty by moving the selecting knob 34 in the axial direction until the teeth on the pinion 30 mesh with the teeth inside a selected index ring 13 and by then turning the knob 34 which turns the index ring 13 and its corresponding type ring 17 so that the desired bar code on that ring 17 can be rotated into the printing position.

The selecting knob 34 is slid in the axial direction, until the pointer 33 of the indicator 32 indicates the index ring 13 to be selected. The knob 34 is then turned which turns the selected index ring, until the pointer 33 comes to indicate the desired index numeral 15. This thereby selects the desired bar code 19 on the ring 17.

To thereafter perform the printing operation, after the selection of the desired types on the type rings 17, the selecting knob 34 is forced, as shown in FIG. 4, all the way into the printing head 10 so that the rotary member 39 is engaged by the gear 30. The knob 34 is turned counter-clockwise as viewed in FIG. 6, by a preset angle until the pointer 33 indicates the "Print" indication 42 on member 39, which locks all the bar code type rings 17 in position.

In response to the rotation of the selecting sleeve shaft 29, the rotary member 39 and the actuating arm 44 move the actuating member 47 down as shown in double-dotted lines in FIG. 6 and in FIG. 7. The tapered surfaces 50a and 50b of the actuating member 47 slide on the tapered surfaces 55a and 55b of the thrust member 52, until the former surfaces are disengaged from the latter, so that the land surfaces 51a and 51b on the actuating member are brought into abutment against the side of the thrust member 52. As a result, the projections 54 at the leading ends of the elastic flaps 53 of the thrust member 52 elastically bias the end of the row of bar code type rings 17 to urge the rings together, thereby to eliminate the gaps G, which were established during the selecting operations, as shown in FIG. 7, so that all of the type rings 17 are forced into close contact. This provides the precise width light spaces of the complete bar codes.

Although the actuating arm 44 with the pinion 46 is shown sandwiched between the actuating member 47 and the rotary member 39, the present invention contemplates a modification in which the rotation of the rotary member 39 is sufficiently transmitted even if the rotary member 39 is formed with a pinion which is sized and shape to directly mesh with the rack 48 of the actuating member 47.

Referring to FIG. 9, each of the bearing members 21 is made of an elastic synthetic resin, and it is fitted in the internal teeth 20 of the corresponding one of the bar code type rings 17, which are also made of a synthetic resin. The upper or arm portions of each bearing member 21 is formed integrally with the paired elastic retaining members 23, which are sized and shaped, e.g. by having lobes at the ends thereof, to mesh with the internal teeth 20 of the corresponding type ring 17 thereby to ensure the reliable indexed rotation of that type ring 17 when the latter is to be selectively turned. On the other hand, the lower or leg portions of the bearing member 21 integrally carries the paired elastic members 24 which are split by the cut portion 25 so that their ends are opposed. They are sized and shaped to engage with the internal teeth 20 of the type ring 17, thereby to absorb the shocks of the type ring 17 when the latter is to be brought into its printing operation. The elastic members 24 are at the bottom since printing of the bar codes is accomplished by moving the printing device downwardly, and the members 24 are positioned for opposing the force upon the bearing member upon movement of the printing device for printing a bar code.

Figure 10:
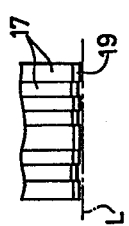
FIGS. 10 and 11 are diagrammatical views illustrating the printing operations by the bar code type rings when the printing surfaces of the bar codes are under irregular or regular conditions, respectively.

In FIG. 10, the respective bar code rings 17, having been selectively turned, now have their selected bar codes 19 arranged on their surfaces under more or less irregular conditions. When the label L is printed, the resultant print by the floating and/or upraised bar codes is thin, whereas the print by the depressed bar codes is crushed, so that the total bar code print is incomplete.

Figure 11:
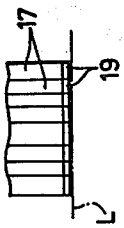

As shown in FIG. 11, therefore, at the instant when the irregularly grouped bar code type rings 17 are printed, the printing surfaces of the bar codes 19 are regularly arranged by the elastically shock-absorbing effects of the two elastic members 24 at the bottom sides of the bearing members 21, so that desirable uniform prints can be attained.

Shock-absorbing effects have not been so high according to the prior art because the leg portions of the bearing members of similar kinds are not split as at 25. With the present invention, however, better shock-absorbing effects can be obtained.

Thus, the present invention produces the following effects.

(1) To move the plural bar code type rings in the axial direction either to force them into close contact or to disengage them, the actuating member with the tapered surfaces thereon is made vertically movable in cooperation with the selecting member and the rotary member, and these vertical movements are transmitted to the thrust plate which is made movable in the axial direction of the type ring group. As a result, the upward and downward sliding movements of the actuating member can be ensured more than in the conventional system of U.S. Pat. No. 4,018,157 in which the tapered surface of the knob is brought into engagement with the pin of the thrust plate.

As another result, the thrust application and release of the respective bar code type rings in the axial direction are ensured so that the type rings can be forced into close contact without difficulty and so that the gaps between the type rings for enabling their rotation can also be established without difficulty.

(2) The thrust member is slidable in the axial direction of the bar code type ring group to apply and release the thrust to and from the type rings. The thrust member is formed with integral elastic flaps. As a result, the close contact between the type rings can be stabilized more than is possible with the conventional system of U.S. Pat. No. 4,018,157. Thus, the desired highly precise prints of the bar codes can be ensured.

(3) The bar code type ring group is thrust in the axial direction. As a result, the close contacts between adjacent type rings can be averaged more than with the conventional system of U.S. Pat. No. 4,018,157, in which the thrust to be exerted upon the type rings is axially established by the turning operation. Thus, better fastening action is attained so that more highly precise prints of the bar codes can be obtained.

The present invention may be embodied in other specific forms without departing from the spirit or essential attributes thereof and, accordingly, reference should be made to the appended claims, rather than to the foregoing specification, as indicating the scope of the invention.

What is claimed is:

1. A bar code printing device, comprising:
   a plurality of index rings juxtaposed to one another in a manner to rotate independently of one another;
   a selecting member for selectively engaging any of the index rings and for then rotating the engaged index ring to a desired rotative position;
   a plurality of bar code type rings juxtaposed to one another in a manner to rotate independently of one another, and each of the bar code type rings being connected to a respective one of the index rings, such that rotation of the index ring rotates the bar code type ring to a respective desired rotative position; the bar code type ring having bar code types formed thereon which are arrayed annularly around the bar code type ring;
   a thrust member located at an end of the plurality of type rings and being movable axialy of the type rings; the thrust member being of yieldable, elastic construction for engaging the end of the plurality of type rings to bias the type rings together; means for opposing the bias of the thrust member and acting on the other end of the plurality of type rings, whereby the thrust member may bias the type rings together;
   an actuating member in engagement with the thrust member, and the actuating member and the thrust member being respectively so shaped that movement of the actuating member in a first direction urges the thrust member toward the plurality of type rings and movement of the actuating member in a second direction frees the thrust member to relax its elastic bias of the plurality of type rings, which frees the type rings to move apart, thereby freeing the type rings to be individually rotated; the actuating member including a rack thereon that moves therewith;
   a rotary member positioned for selective engagement by the selecting member and, upon such engagement, the rotary member being rotatable by the selecting member;
   the rotary member including means which rotate with the rotary member and which engage the rack for moving the actuating member in the first direction upon rotation of the rotary member in a third direction and for moving the actuating member in the second direction upon rotation of the rotary member in a fourth direction opposite the third direction.

2. The bar code printing device of claim 1, wherein the means which rotates with the rotary member comprises an actuating arm mounted on the rotary member in a manner to rotate with the rotary member; the actuating arm extending to the rack and including thereon the means which engages the rack.

3. The bar code printing device of claim 1, further comprising means for guiding the actuating member for substantially straight line reciprocating motion in the first and the second directions across the axis of the type rings.

4. The bar code printing device of claim 3, wherein the thrust member has a first surface thereon facing toward and extending in the direction toward the actuating member, and the actuating member has a land surface thereon facing toward the thrust member, such that movement of the actuating member in the first direction moves the land surface to be at the thrust member first surface, for thereby urging the thrust member to bias the type rings together, and movement of the actuating member in the second direction moves the land surface to be away from the thrust member first surface for enabling the thrust member to move to release the biasing force on the type rings.

5. The bar code printing device of claim 4, wherein at least one of the first surface and the land surface has a tapered shape surface, which tapers along the side thereof that first abuts the other of the first surface and the land surface upon the movement of the actuating member in the first direction, and the tapering surface tapers in the direction toward the other of actuating member and the thrust member for easing the movement together of the actuating member and the thrust member and for easing the movement of the land surface onto the first surface.

6. The bar code printing device of claim 5, wherein the abutting sides of both of the first and land surfaces are cooperatingly complementarily tapered.

7. The bar code printing device of claim 1, wherein the thrust member has a first surface thereon facing toward and extending in the direction toward the actuating member, and the actuating member has a land surface thereon facing toward the thrust member, such that movement of the actuating member in the first direction moves the land surface to be at the thrust member first surface, for thereby urging the thrust member to bias the type rings together, and movement of the actuating member in the second direction moves the land surface to be away from the thrust member first surface for enabling the thrust member to move to release the biasing force on the type rings.

8. The bar code printing device of claim 7, wherein the thrust member is elastic by means of elastic flaps thereon which engage the type rings.

9. The bar code printing device of claim 7, further comprising a respective opening through each of the type rings, and the openings being defined by internal teeth formed in the respective type rings;
a respective bearing member in the opening in each type ring, the bearing member including a first elastic retaining arm, which is sized and shaped to mesh with the internal teeth of the respective type ring for causing indexed rotation of the type ring.

10. The bar code printing device of claim 1, further comprising a respective opening through each of the type rings, and the openings being defined by internal teeth formed in the respective type rings;
a respective bearing member in the opening in each type ring, the bearing member including a first elastic retaining arm, which is sized and shaped to mesh with the internal teeth of the respective type ring for causing indexed rotation of the type ring.

11. The bar code printing device of claim 10, wherein the bearing member includes a pair of the first elastic retaining arms, each extending around the type ring in a respective direction opposite from the other first retaining arm.

12. The bar code printing device of claim 11, wherein the bearing member includes a second retaining arm, also engaging the internal teeth of the opening in the type ring and being spaced from the first retaining arm, the second retaining arm being for absorbing the shock on the bar code type ring upon the printing operation.

13. The bar code printing device of claim 10, wherein the bearing member includes a second retaining arm, also engaging the internal teeth of the opening in the type ring and being spaced from the first retaining arm, the second retaining arm being for absorbing the shock on the bar code type ring upon the printing operation.

14. The bar code printing device of claim 13, wherein there is a printing direction in which the printing device is moved when a bar code is printed; the second retaining arm being positioned for opposing the force upon the bearing member upon movement of the printing device for printing a bar code.

15. The bar code printing device of either of claims 13 or 14, wherein there are two of the second retaining arms, which extend in opposite directions around the opening in the respective type ring.

16. The bar code printing device of claim 15, wherein the second retaining arms are positioned to have opposed ends that are separated by a gap between them.

17. The bar code printing device of claim 1, wherein the thrust member is elastic by means of elastic flaps thereon which engage the type rings.

18. The bar code printing device of claim 1, wherein the rotary member and the index rings have respective openings therein, and the selecting member comprises a shaft extendable through and movable through these openings; the selecting member shaft including engaging means thereon for being selectively moved into any of the openings and for engaging each index ring and the rotary member inside the opening thereof for effecting rotation thereof.

19. The bar code printing device of claim 18, wherein the openings are defined by internal teeth and the engaging means comprises a pinion on the selecting member shaft for engaging the internal teeth.

20. The bar code printing device of claim 1, wherein the index rings are in mesh with the respective bar code type rings for effecting rotation of the bar code type rings.

* * * * *